United States Patent [19]
Elton et al.

[11] 3,870,593
[45] Mar. 11, 1975

[54] STRETCH-ORIENTED POROUS FILMS AND PREPARATION AND USE THEREOF

[75] Inventors: Robert L. Elton, White Bear Lake; John F. Vander Louw, Woodbury, both of Minn.

[73] Assignee: Minnesota Mining and Manufacturing Company, St. Paul, Minn.

[22] Filed: Apr. 29, 1974

[21] Appl. No.: 465,273

Related U.S. Application Data

[62] Division of Ser. No. 260,321, June 6, 1972, Pat. No. 3,844,865.

[52] U.S. Cl. ........... 161/159, 161/160, 161/167, 161/190, 161/402, 161/DIG. 2, 260/2.5 AY
[51] Int. Cl. ............... B32b 3/00, B29c 17/02
[58] Field of Search ......... 161/159, 160, 167, 190, 161/402, DIG. 2; 260/2.5 AY

[56] References Cited
UNITED STATES PATENTS

| 3,409,495 | 11/1968 | Rasmussen | 161/402 |
| 3,426,754 | 2/1969 | Bierenbaum | 161/402 |
| 3,485,705 | 12/1969 | Harmon | 161/402 |
| 3,729,538 | 4/1973 | Cunningham et al | 161/159 |

*Primary Examiner*—William J. Van Balen
*Attorney, Agent, or Firm*—Alexander, Sell, Steldt & DeLaHunt

[57] ABSTRACT

Porosity (preferably microporosity) can be introduced into a polymeric film by (1) dispersing finely divided particles of a non-hygroscopic inorganic salt such as calcium carbonate into a suitable polymer, e.g., by milling, (2) forming a film of the filled polymer, and (3) stretching the film to provide good porosity and water absorptive or transmissive characteristics. It is unnecessary to leach out the particles of the inorganic salt, and the resulting porous film is useful in laminates, adhesive tapes, gas permeable containers, first aid dressings, and the like even though it still contains these particles.

6 Claims, 4 Drawing Figures

STRETCH-ORIENTED POROUS FILMS AND PREPARATION AND USE THEREOF

This is a division of application Ser. No. 260,321, filed June 6, 1972 now U.S. Pat. No. 3,844,865.

FIELD OF THE INVENTION

This invention relates to porous (preferably microporous) films made from suitable polymers and articles of manufacture (laminates, adhesive tapes, permeable containers, first aid dressings, etc.) made from the porous films. An aspect of this invention relates to the incorporation of a pore-forming or nucleating non-hygroscopic particulate material into the polymer prior to formation of the film, which particulate materials remain in the film after the film is made porous. Another aspect of this invention relates to a method for introducing porosity into a filled polymeric film without leaching out or otherwise removing the filler. Another aspect of this invention relates to the utilization of particular pore-forming or pore-nucleating agents in the manufacture of microporous polymeric films and the utilization of the films in various fabricated products.

DESCRIPTION OF THE PRIOR ART

It is known that microporous films can be made by mixing a leachable filler with a polymeric material, forming the filled polymer into a film, and leaching the filler from the film with water or a suitable solvent for the filler. A recently-developed example of this technique is described in U.S. Pat. No. 3,376,238 (Gregorian et al.), issued Apr. 2, 1968. See also British Pat. No. 1,126,849, published Sept. 1968, and British Pat. No. 1,051,320, published Dec. 1966. The resulting leached film contains micropores, i.e., pores smaller than abut 25 microns, and can be capable of transmitting water vapor, a property known as water vapor permeability or "moisture vapor transmission" (hereinafter referred to as "MVT"). It has been found that stretch-orientation of a sodium chloride-filled film prior to leaching out of sodium chloride with water improves the water vapor permeability. See British Pat. No. 844,801, published Aug. 17, 1960. The water- or solvent-leach step can be quite lengthy, and it is difficult to be sure that all traces of the filler have been removed. It would simplify the prior art processes greatly if the leach step could be omitted.

The selection of a filler can also pose problems. Organic, solvent-soluble or water-soluble fillers are generally expensive and subject to degradation by heat (and possible side reactions with the polymer), while inorganic water soluble fillers such as NaCl and NaBr tend to be hygroscopic, have a caking tendency which makes them difficult and/or wasteful to handle, and are difficult and expensive to obtain in pure and/or finely-divided form. The ideal filler would be inorganic, high-melting, non-hygroscopic (i.e., less hygroscopic than pure or commercial grade NaCl) easily purified, easily pulverized, abundant, inexpensive, and free of caking tendencies. Such fillers exist, e.g., calcium carbonate, but are water insoluble. They can be leached out with acids, e.g., aqueous HCl, but it is undesirable to expose a polymeric material to strong acids and bases, and the gas formed ($CO_2$) from the reaction with HCl could impede the leaching and cause extremely low leach rates. Furthermore, an acid leach step generally creates the need for a second leach step with pure water, as is shown in Examples 2, 3, 5, and 6 of British Pat. No. 1,126,849. Thus, calcium carbonate or the like is commonly used as a filler which has no pore-forming function, as in the products described in U.S. Pat. Nos. 3,245,942 (Limperos), issued Apr. 12, 1966, and 3,154,461 (Johnson. calcium carbonate is also used as an additive to solvent cast microporous films; see U.S. Pat. No. 3,496,001 (Minobe et al.), issued Feb. 17, 1970. It has been suggested that pores can be formed without a leaching step by including a milled elastomer in a polymer matrix and stretching the filled matrix. See U.S. Pat. No. 3,407,253 (Yoshimura et al.). However, this technique can be difficult to control, at least in terms of the size and shape of the resulting pores. Furthermore, the milled elastomer lacks the previously described advantages of an inorganic filler such as calcium carbonate. The use of a pore-nucleating agent is omitted completely in the process described in U.S. Pat. No. 3,558,764, issued Jan. 26, 1971, but this process involves a multitude of steps which are necessary in the present invention.

Calcium carbonate has been used as a filler in the solvent/nonsolvent method of producing mircoporosity (see U.S. Pat. No. 3,555,129, Jan. 12, 1971), but merely as a means for facilitating the leaching out of the solvent, not to eliminate a leaching step.

Accordingly, this invention contemplates porous (preferably microporous) films made by stretch-orientation of a filled polymeric matrix wherein the filler is not leached from the film, yet serves as a nucleating agent for forming pores during the stretch orientation step. This invention further contemplates microporous films made by a stretch orientation technique wherein a nucleating agent forms pores during the stretch orientation step, and this nucleating agent is inorganic, high-melting, non-hydroscopic, easily purified, abundant, inexpensive, free of caking tendencies when handled in bulk quantities, and commercially available as particles having a suitable fine degree of sub-division, e.g., averaging less than 15 microns in diameter. This invention also contemplates products derived from these microporous films, e.g., laminates, adhesive tapes with porous backings, first aid dressings, gas- or steam-permeable bags or containers, and the like.

BRIEF SUMMARY OF THE INVENTION

Briefly, this invention involves (1) dispersing finely divided particles of calcium carbonate or the like into a suitable polymer by a milling step or the like, (2) forming a film of the filled polymer by a heat-forming process such as extrusion, calendering, or pressing, and (3) stretching the film to induce an interconnecting porous structure in the film, whereby the film is rendered porous (i.e., macroporous or microporous, preferably microporous) without removing the filler particles. It is not clearly understood why removal of the filler particles is unnecessary. Although this invention is not bound by any theory, it is believed that the polymer matrix separates from the filler particles during the stretching step, and upon release of tension, the relaxed matrix does not completely return to its original shape. This incomplete relaxation or return results in micropores which are larger than the enclosed filler particles. Surprisingly, the enclosed filler particles do not substantially interfere with the permeability of the porous film. In fact, the moisture vapor transmission (MVT) of the porous film is not measurably improved by leaching out the CaCO₃ filler with aqueous acid or the like. This observation is difficult to explain, particularly since the prior art (e.g., British Pat. No. 844,801) clearly calls for a leaching step. The elimination of the leaching step and the ability to use fillers such as calcium carbonate result in a process which provides a porous film of polymer at very nearly the same cost as non-porous films of similar thickness. Apparently, the pores formed by the process of this invention are not closed cells and are somehow interconnected. This, too, is difficult to explain, but is apparently due in some measure to the effects of stretch orientation combined with the amount, number, and size of calcium carbonate particles. There is some evidence to indicate that moisture or gases passing through films of this invention normally have to pursue a tortuous path of relatively large cavities connected to each other by submicron sized openings or passages, as will be explained subsequently.

DESCRIPTION OF THE DRAWINGS

In FIG. 1, first aid dressing 10 is an adhesive tape having a backing 11, which is a microporous film of this invention, a pressure-sensitive adhesive coating 13, which has been made porous and which can be acrylate pressure-sensitive adhesive of the type disclosed in Ulrich U.S. Patent Re. 24,906, issued Dec. 1960, release liners 15 and 16, for protecting the adhesive layer prior to use, and a conventional absorbent (e.g., gauze) pad 17. When in place on the skin, moisture from the skin can pass through the adhesive coating 13 and through film 11 at a controlled rate. The ability of the dressing 10 to "breathe" in this fashion is beneficial to the skin.

FIGS. 2 and 3 both illustrate films of this invention, 23 and 33, respectively, wound directly upon themselves around a central core forming a plurality of overlapping convolutions, 21 and 31, respectively, thus providing conveniently stored rolls 20 and 30 which can be unwound to provide desired lengths of film 23 and 33. Film 23 is coated on its inner major surface with a pressure-sensitive adhesive 25 which does not delaminate or offset as the tape is unrolled. Rubber-resin or acrylate pressure-sensitive adhesives can be used as adhesive 25, and the adhesive can be made porous, if desired. Since film 23 is porous, it can transmit moisture or gases as does first aid dressing 10 of FIG. 1. Film 23 also accepts liquid or solid deposits and can serve as a writing surface for oleaginous or alcohol and/or water-based inks or writing fluids or graphite pencil marks. Film 23 can thus be provided with printed matter on its uncoated major surface so that it can serve as a label tape. Film 33 of FIG. 3 is laminated to a non-adherent, moisture transmissive burn covering material 35. Thus, the film/covering composite (33 and 35) can be unrolled, cut to the desired length, e.g., with strips of porous adhesive tape from tape roll 20. The thus-bandaged burn area is permitted to transmit moisture at a controlled rate through film 33, with significant beneficial effects upon the healing of the burn.

FIG. 4 illustrates a typical configuration for a bag 40 for surgical instruments or other medical devices or the like which can be sterilized in a gas (e.g., ethylene oxide) sterilizer or, if suitably heat-resistant, in a steam autoclave. Bag 40 is made two opposed sheets of non-porous polyethylene film 41 and 42 (or other heat sealable polymer, e.g., polypropylene, polyester, etc.), which form a package after being heat treated around all but one side of their peripheries, i.e., end 45, to form a 3-sided "chevron" type peelable heat seal area 43. Although polyethylene film can be heat bonded to itself to form a peelable heat seal, an adhesive seal area on one or both plies can be also used; see, for example, U.S. Pat. No. 3,217,871 (Lee) issued Nov., 1965. The object to be sterilized and stored is inserted through open end 45 and the heat seal area 43 is then extended by applying heat across end 45. Bag 40 is then ready for sterilizing. To permit entry and exit of sterilizing gas, a filter panel 49 of porous polypropylene film of this invention is laminated to the periphery 47 of a rectangular opening in film 41. The object (e.g., dressing or surgical instrument) which has been sealed in bag 40 and sterilized therein can then be stored in sterilized condition until the bag is cut or peeled open by the physician or nurse. The effective diameter of the pores of filter panel 49 is small enough (e.g., less than 0.5 micron) to serve as an effective barrier for bacteria, but not so small as to prevent entry and exit of sterilizing fluid, e.g., steam or ethylene oxide gas.

DETAILED DESCRIPTION AND EXAMPLES

Figure 1:
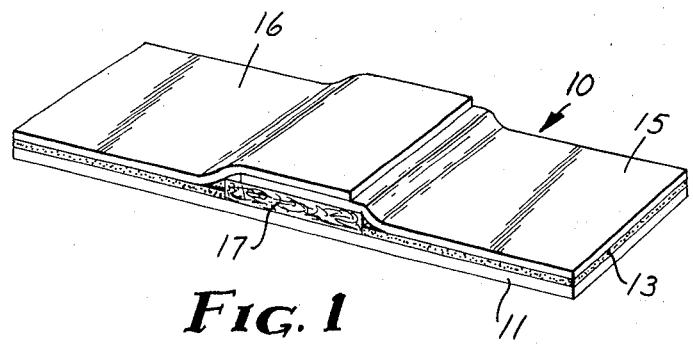
FIG. 1 is a perspective view of an adhesive first aid dressing utilizing a microporous film of this invention as the adhesive tape backing.
Figures 2, 3:
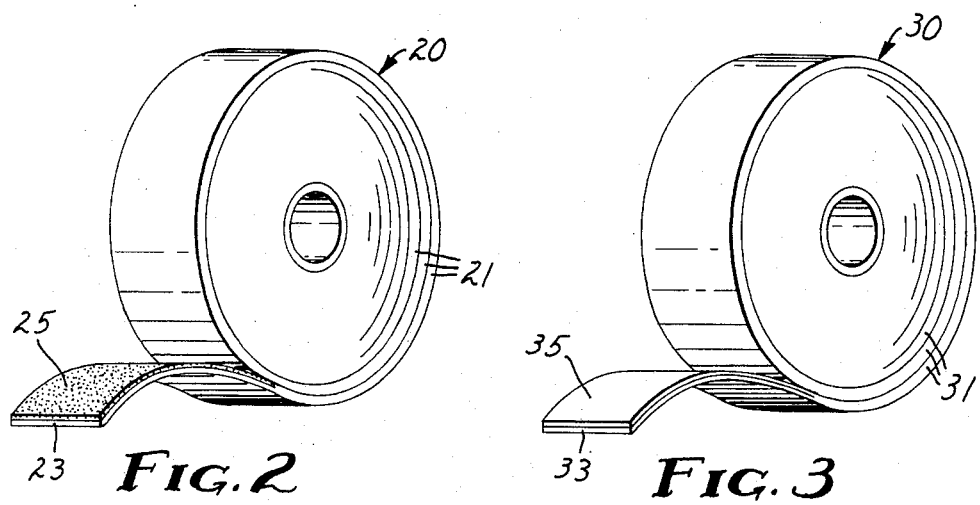
FIG. 2 is a perspective view of a pressure-sensitive adhesive tape roll, wherein the backing is a film of this invention.
FIG. 3 is a perspective view of a roll of burn dressing material wherein the backing of the dressing is a film of this invention.

The teachings of this invention can be utilized to provide porous films from a wide variety of film-forming polymeric materials, preferbly of two diverse types: (1) stretch-orientable, non-elastomeric, at least partially crystalline polymers derived from polymerization of one or more unsaturated monomers and (2) stretch orientable polyurethanes. Among the non-elastomeric, crystalline-type polymers, it is preferred to use extrudable polymers having the formula

where $n$ is the index of polymerization and X is hydrogen, lower alkyl (e.g., methyl or ethyl), halogen, —OCOR' where R' is lower alkyl or aryl, hyrdoxyl, nitrilo, an aromatic group, an ester group, or the like and R is hydrogen, lower alkyl (e.g., methyl or ethyl), halogen, or the like. Typical members of this class of polymers can be made from one or more unsaturated monomers such as vinyl chloride or other vinyl monomers; vinylidene chloride or other vinylidene monomers; ethylene, propylene, 1-butene, and similar mono-unsaturated or poly-unsaturated hydrocarbons, acrylic monomers (e.g., acrylonitrile); styrene, etc. Thus, copolymers, terpolymers, etc., are also contemplated as are conventional modifications and chemical, physical, and radiological after treatments. Other modifications, e.g., plasticizing with conventional plasticizers (including the dialkyl phthalates and sebacates, the epoxidized soybean oils, etc.) are also permissible and generally preferable with relatively brittle materials such as polyvinylchloride (PVC). For most uses of microporous films, it has been found that the polyolefins, particularly polypropylene, are the preferred class of crystalline or partially crystalline stretch orientable polymers, while olefin, conjugated olefin, vinyl arene, and ethylene-vinyl acetate polymers are least preferred. Some of the rubbery or elastomeric A-B-A block copolymers and ethylene-vinyl acetate copolymers have been found to be somewhat resistant to the porosity-inducing techniques of this invention. The above-described polymers can also be mixed, and mixtures of polyethylene and polypropylene (e.g., 2:1 polypropylene: polyethylene) are particularly useful. Another preferred class of polymers includes a wide variety of conventional polyurethanes, e.g., extrudable elastomers of the polyetherurethane or polyesterurethane type, which can be elastomeric. The elastomeric polyurethanes are preferably stretch oriented at elevated temperatures, e.g., 90°–150°C. The term elastomeric is used herein in accordance with the ASTM definition: "a material which at room temperature can be repeatedly stretched to at least twice its original length and upon immediate release of the stress will return with force to its approximate original length" is an "elastomer."

Other less preferred polymers include the polyesters (e.g., polyethylene terephthalate), the nylons, the perfluorinated olefins (polytetrafluoroethylene, polytrifluorochloroethylene), etc.

The principal requirements to be met in selecting a suitable urethane-type polymer or a suitable crystalline or semi-crystalline, non-elastomeric polymer are physical rather than chemical. The polymer should be capable of being "heat formed" (i.e., extruded, calendered, or pressed), without significant degradation, into a thin (less than 2 mm, preferably less than 1 mm) film. After film-formation, the polymer should be capable of at least uniaxial orientation, and preferably biaxial orientation as well. That is, at normal ambient or elevated temperatures, the polymeric film should stretch more than 50 percent (e.g., at least 100 percent) of its original length without breaking, and significant tensile stress should be exerted by the film during stretching. Stated another way, the film is preferably capable of at least a 1.5:1 orientation along at least one axis. Furthermore, it is essential that, upon release of the stretching force, the stretched film should have and retain some physical change introduced by the stretching, e.g., an at least partially ordered molecular orientation or strain pattern, preferably an orientation along the lines of the stress exerted during elongation. Reference is again made to the polyolefins, e.g., polypropylene, and the polyurethanes, as preferred examples of polymers which have properties which permit uniaxial or biaxial stretch orientation with at least partial retention of stretch-induced characteristics. When oriented at 90° – 150° C., even the "elastomeric" urethane-type show some permanent effects from the stretching, e.g., a measurable decrease in film caliper. It has also been found that opacity, softness, or flexibility, and strength are increased by the stretch orientation. These additional benefits can be taken advantage of in a number of ways; for example, the increased opacity can eliminate the need for expensive pigments such as titanium dioxide, though pigments can also be included if desired.

In the present application, stretching is described either as a percent elongation at maximum stretch or as the ratio of stretched length to original length. A stretch ratio of 1.0 would thus be 0 percent elongation and a stretch ratio of 2 (i.e., 2:1) would be 100 percent elongation.

The uniaxial or biaxial stretch ratio used to stretch orient films of this invention preferably is greater than 1.5 (i.e., 50 percent elongation). The upper limit of uniaxial stretch orientation is determined by the percent elongation-at-break capability of the filled film. Preferred polymers of films of this invention permit a uniaxial stretching or elongation of 300 percent (4:1) or more, particularly at elevated temperatures, with little or no danger of breaking. Polyolefin films may by subject to rupture during biaxial 3 × 3 stretching. Uniaxial orientations of up to 8:1 can be obtained with polypropylene, however. Stretching can be carried out at normal ambient temperatures, but is preferably done at elevated temperatures up to a few degrees below the melting point of the polymer or the temperature at which significant degradation begins to occur, whichever temperature occurs first. Degradation or undue softening of the film can generally be avoided by limiting this elevated temperature range to below about 175° C.

Biaxial stretching, either balanced or unbalanced, is preferred. For polyurethanes, dramatic increases in porosity are achieved by stretching at least 1.5:1 (preferably at least 2:1) in both directions. The increases begin to be less noticeable when the stretch has reached 4 × 4 or even 4 × 2.5. With a stretch of at least 2:1 with polyurethane film (2.5:1 for polypropylene film), the entire film will generally be oriented. Some unoriented areas may occur below these ratios.

As pointed out previously, the stretch-oriented films filled with calcium carbonate particles, or some other suitable non-hygroscopic water-insoluble inorganic metal salt pore-nucleating agent, need not be leached: the pore-nucleating agent remains within the pores of the film, yet the moisture vapor transmission (MVT) and water absorption properties and void volume of the stretch-oriented filled film all appear to be comparable to those of leached films, including stretch-oriented leached films. The "void volume" is determined from the "true density" and "apparent density" of the film. The "true density" is a weighted average of the density of the polymer and the materials incorporated in it, including, of course, the pore-nucleating agent. For example, the "true density" of high density polypropylene filled with $CaCO_3$ (hexagonal) would be the average of 0.96 g/cc and 2.71 g/cc, respectively, weighted according to the ratio of polypropylene to hexagonal calcium carbonate. A l"true density" can also be determined empirically from the weight per unit volume of the filled, unstretched film. The "apparent density" of the porous, stretch-oriented film is its weight per unit of apparent volume (apparent volume includes pore volume). The percent void volume is then given by:

(True Density — Apparent Density)/(True Density) × 100

Void volumes of greater than 5 volume percent and up to about 50 or 60 percent or more can be obtained by the teachings of this invention, even though the resulting porous films still contain 5–60 percent by volume of the relatively dense pore-nucleating agent interspersed throughout the porous polymeric structure. For example, the porous polymeric film could contain about 50 volume percent of porenucleating agent within the porous structure and still have a void volume of about 50 percent. The gain in void volume which would be obtained by leaching out of the filler can readily be sacrificed for the contemplated uses of this invention, thereby eliminating a lengthy leach time and achieving a large saving in plant time, as well as a substantial simplification of manufacturing equipment and procedures.

The liquid-absorptive capacity of the stretch-oriented porous films of this invention can be qualitatively determined by the simple expedient of dripping various liquids onto a film sample. Norporous films of, for example, polypropylene or filled polypropylene will repel the liquid and the droplets will remain on the surface of the film. The stretch-oriented porous films of this invention, however, are readily permeated by droplets of a wide variety of polar and nonpolar organic liquids and solutions. Water and aqueous solutions also permeate these films with the help of a surfactant. This permeation can proceed all the way through the film sample, indicating an interconnecting pore structure.

Further evidence of an interconnecting pore structure is obtained from photomicrographs and moisture vapor transmission (MVT) studies. A standard MVT test (also called LPV for "leather permeability value" when the sample is a leather-like material) is described in column 7, line 16 et seq. of U.S. Pat. No. 2,723,935 (Rodman), issued Nov. 1955, and is expressed in grams of water per 100 square meters per hour (g/100 m²hr) for a given temperature relative humidity (R.H.) difference. Other commonly used MVT units are in $\mu$ gm/cm² hr. Throughout this application, the R.H. difference for the MVT values has been set at no more than about 100/50 percent but no less than about 100/60 percent, and the temperature was kept at 22 – 24° C. (71.6° – 75° F.). An MVT of 500 g/hr/100 m² is considered significant, and an MVT of 8,000 or 9,000 is considered extremely high — higher than typical highly hydrophilic and moisture permeable materials such as leather. Yet MVT values near the upper end of this range, e.g., 3,000 – 7,700, can readily be obtained according to the teachings of this invention without a leaching step. Surprisingly, no gain in MVT can be positively confirmed by leaching the pore-nucleating filler from the stretch-oriented porous film, because the observed "gain" is generally within the limits of the 10 percent experimental error inherent in the aforementioned MVT test. Furthermore, MVT rates of 1,000 – 4,000 are considered good for less demanding uses of moisture permeable films, e.g., in complex laminates such as leather substitutes. The MVT rate for first aid dressings is preferably above 3,000. Another useful index of both porosity and gas permeability can be obtained from Gurley densometer readings, wherein a given volume of air (e.g., 50 cc or 100 cc) traverses a given area of film with a given caliper. The number of seconds should be less than 1,000, preferably less than 400 for 50 cc of air to traverse a square inch (6.45 cm²) of a porous film with a caliper of about 6±1 mils (150± 25 microns). (It should be borne in mind that all film thicknesses specified in this application are subejct to caliper control variations of about ± 1 mil, i.e., ± 25 mircons.)

The aforementioned photomicrographic studies show cross sections of film with relatively large (e.g., larger than 2 or 3 microns) cavities containing pore-nucleating agents. These cavities appear to be interconnected by sub-micron sized openings or passageways. It is theorized that the sub-micron interconnecting passages determine the rate of transmission of liquids or gases through the film. The pore size and shape of the stretch-oriented porous films of this invention is determined primarily by two factors: the shape and size of the pore-nucleating particles and the type and amount of stretching. Upon microscopic examination, the pores appear to be larger than the pore-nucleating particles, but these particles do determine the minimum size of the pores. The pores tend to be elongated in shape and have one or more major axes parallel to the axes of stretch orientation. For example, using pore-nucleating orthorhombic or hexagonal particles averaging about 3 mircons in their longest dimension, the pores, after stretching of 3:1 (200 percent) or more, average at least 3 or 4 microns in their shortest dimension but more than double, ordinarily more than triple, this amount in their longest dimension. With uniaxial stretching, the pores can be seen to have two short and one long dimension, with biaxial stretching, two long and one short dimension.

To obtain the desired MVT, pore volume, liquid absorptivity, etc., the pore-nucleating agent can be combined with a suitable polymeric matrix in the amount of at least 5 weight per cent of the total weight of film-forming composition, preferable at least 5 volume per cent of the total volume of the film-forming composition. A particularly useful range of pore-nucleating agent content is about 20 to about 75 weight per cent, 40 – 70 wt. percent being typical for the contemplated uses of this invention. The size of the pore-nucleating agent particles can range from colloidal in size to about 25 or 30 microns, for microporous films, and about 25 to about 250 microns, for typical macroporous films. The preferred particle size range for microporous films is about 1 to about 15 microns — for calcium carbonate, this entire range is commerically available. The incorporation of at least 5 wt. percent, preferably at least 20 wt. percent of pore-nucleating agent is normally required to obtain the formation of the high interconnecting void volume of this invention. Stretching alone, even with small amounts ( 5 wt. percent ) of $CaCO_3$ present, appears to produce primarily discontinuous, unconnected pores. (An interconnecting pore structure can be achieved without a pore-nucleating agent according to the disclosure of U.S. Pat. No. 3,558,764, but this disclosure calls for a multi-step drawing/annealing/cold-drawing/heat-setting procedure which is unnecessary in the present invention.)

The film forming processes used in this invention, e.g., pressing, calendering, or extruding of milled polymer/inorganic salt mixtures, are well known in the art. Heating of the milled mixture is conventionally involved in these film-forming methods. The pore-nucleating particles of the inorganic salt can be added in increments during the milling step. Casting, e.g., of solutions of polymer filled with pore-nucleating particles, is not preferred.

The preferred inorganic fillers used in this invention are non-hygroscopic, light-colored, water insoluble, low density (below 3.0 g/cc), highly pure, easily pulverized (i.e., below about 5 on the Moh's scale) finely divided, high-melting (i.e., above organic polymer degradation or melting ranges) solid inorganic metal salt particles. Calcium carbonate particles, which are preferred, can be in any suitable naturally occurring or man-made form. Naturally occurring forms include the rather pure crystals of calcite (hexagonal calcium carbonate) and aragonite (orthorhombic calcium carbonate). The melting point of calcium carbonate (above 800° C.) is far in excess of any temperatures that might be used, even momentarily, to treat an organic polymer; its calcite form is rated at 3 on Moh's Scale of Hardness, barely above gypsum. This degree of softness permits easy and rapid pulverizing. Suitable man-made, highly pure forms of calcium carbonate include precipitated chalk and the like. Very finely divided, pure particles of this carbonate (e.g., 0.05 – 10 microns) are commercially available in large quantities. Calcium carbonate is aptly described as "water insoluble." By "water-insoluble" is meant a solid which cannot be dissolved in deionized water (of pH = 7) to a sufficient extent to form a 0.1 wt. percent aqueous solution at 23° C. Even at 100° C., $CaCO_3$ will not form even a 0.003 percent aqueous solution in deionized water; about 0.002 percent is its maximum water solubility. The insolubility of calcium carbonate in organic materials such as plasticizers is also a useful property in the context of this invention.

Calcium carbonate is non-hygroscopic in the sense that it does not pick up moisture from the air, and particles of this salt do not have a tendency to "cake" or agglomerate due to absorbed moisture. Commercial grades of sodium chloride, for example, are too hygroscopic to be convenient for use in this invention. The specific gravity of hexagonal calcium carbonate is only slightly above 2.7, and all forms of the salt have a specific gravity of less than 3.

Calcium carbonate is acid sensitive, but is generally non-reactive with organic polymers such as polyolefins and polyurethanes; it is, for all practical purposes, substantially neutral in organic media.

Other inorganic salts with properties similar to calcium carbonate, e.g., the alkaline earth metal carbonates and sulfates of low water solubility such as magnesium carbonate, calcium sulfate, and barium sulfate, can be substituted for calcium carbonate in this invention. Generally, however, these other salts lack one or more advantage of calcium carbonate. Barium sulfate is water insoluble, soft (2.5 – 3.5 on Moh's scale), very high melting, and generally white or light colored in finely divided form, but its specific gravity of almost 4.5 detracts from the prospect of making light weight films which contain high loadings of unleached filler.

Calcium sulfate is low in hardness, low in density, light in color, and very high melting, but is more water soluble than calcium carbonate. Being capable of acidic behavior, this salt is not neutral and may react with some organic polymers at elevated temperatures. Magnesium carbonate is more neutral and water insoluble, but is slightly harder, slightly denser, and subject to decomposition at relatively low temperatures, e.g., 350° – 400° C. Generally the organic polymers used in this invention are not subjected to any heat treatments involving temperatures above 200° C.; however, many organic polymers will withstand very brief heat treatments at temperatures near the decomposition temperature of magnesium carbonate. It is useful to have the wide safety factor provided by the extremely high melting points (above 400° C.) of the preferred inorganic fillers of this invention. It is within the scope of this invention to use colored forms of the pore-nucleating agent, or to add color to it. Calcite, for example, occurs naturally in a wide variety of colors. As has been pointed out previously, the pore-nucleating agent can do double duty as pore-forming and pigmentation agent. The pore-nucleating agents, after stretching, are located within the walls of the pores or otherwise associated with the porous film structure, and can impart both color and opacity to the stretch-oriented, microporous films of this invention.

Stretch-oriented, macroporous or microporous polymeric films containing the pore-nucleating agent can be made according to this invention within a wide range of film thickness or caliper. For the uses contemplated for this invention, a thickness of less than about 2 mm. (80 mils) is generally preferred. Films having a thickness in the range of about 0.1 to about 1 mm (about 0.5 – 40 mils) are particularly useful. As pointed out previously, a measurable decrease in caliper or thickness normally occurs after stretch-orientation. Even for a uniaxial orientation, this decrease can be as much as about one-third of the unoriented film thickness. For biaxial orientation and extremely large uniaxial orientations, the decrease in thickness can be still greater.

The polyolefin most preferred for use in the present invention is polypropylene of either the low density (0.90 g/cc) or high density (0.96 g/cc) grades. Polyurethane polymers used in the present invention are preferably derived from aliphatic or aromatic di- or triisocyanates and polyesters or poly(oxyalkylene) diols or triols of 200 – 10,000 (preferably 400 – 6,000) molecular weight. It is permissible to use polyesters or polyethers terminated with other than OH radicals, e.g., mercaptans, primary or secondary amines, carboxyls, or other active-hydrogen-bearing substituents. Chain extenders and/or crosslinkers terminated with such active hydrogen-bearing substituents are usually included in the polymer preparation. It is surprising that elastomeric polyurethanes behave analogously to the polypropylene with respect to increasing MVT by stretch orientation.

The stretch-oriented porous films of this invention (particularly the microporous films) can be adapted for use in a variety of applications, as films per se, preferably, as printed, coated, or laminated articles. That is, these films can be combined with coatings, additional film-like or fibrous laminae, etc. Among the applications contemplated for this invention are filters, breathable bandages, and other vapor permeable first aid dressings, surgical drapes and similar medical products, conformable and printable backings for coated and laminated articles, typewriter and other inking ribbons and sheets or pads, breathable garmets, or clothing materials of footwear such as leather substitutes or rainwear, battery separators (particularly in alkaline batteries), breathable shoe inserts or insole material, flexible gas-permeable containers (e.g., sterilizable packages for surgical instruments; see U.S. Pat. No. 3,332,549, issued July 25, 1967) and the like.

Examples of known coating and laminating techniques can be found in the prior art already cited and in, for example, U.S. Pat. No. 2,826,509. The stretch-oriented porous films can be made with varying degrees of rubberiness, flexibility, rigidity, porosity, liquid-absorptivity, moisture vapor transmission, and ion-transfer characteristics, depending on the use contemplated. Fillers, in addition to the pore-nucleating agents, can be added to modify these various properties. Wetting agents or surfactants can be added to the stretch-oriented porous films to alter or improve their absorptivity of polar liquids, including water. For example, a stretch-oriented microporous polypropylene film of this invention will not normally permit water to pass all the way through the thickness of the film, but suitable wetting agents will readily promote liquid water penetration.

A particularly useful application of the stretch-oriented microporous films of this invention is to provide a polymeric film with many of the characteristics of writing paper. For example, films of this invention with a high void content are flexible, conformable, tearable, fine-textured, and opaque white in color, and thin and sheet-like, much like paper stock. Furthermore, the high void content and permeability of the film provides good ink and dye anchorage. Such films can readily be written on either surface with an oleaginous printing ink, a fountain pen ink, or the like.

In summary, the contemplated composites or fabricated products containing stretch-oriented microporous films of this invention are coated, laminated, liquid (e.g., ink) -impregnated articles, or articles having indicia printed on at least one surface of the stretch-oriented porous film.

The following non-limiting examples illustrate the invention.

EXAMPLE 1

Four hundred grams of polypropylene resin ("Profax 6723" — Hercules, Inc.) was banded on a two-roll rubber mill heated at 380° – 390° F. (193 – 199° C.). After banding (2 minutes), 900 g. $CaCO_3$ was added to the mill. The $CaCO_3$ was "Non-Fer-Al" Grade obtained from Diamond Chemical Company. This was a highly pure grade (99.3% $CaCO_3$) with an average particle size of 3 microns diameter and a range of 1 - 10 microns diameter. The major impurity was $CaSO_4$ (0.5%). The pH was 9.4. About 15 minutes was required for complete dispersion of the $CaCO_3$ in the polypropylene. Next, the mill stock was knifed off the mill and cooled. A 15 g. sample was next pressed in a Pasadena Hydraulic press between sheets of polytetrafluoroethylene film. The press was maintained at 425° F. (218° C.) A force of 30,000 lbs. (13,600 Kg) was applied. The film sample was removed after pressing about 30 seconds. Next, a strip of film 2 inches wide and 6 inches long (5.1 × 15 cm) was placed in a Thelco forced air lab oven maintained at 110° C. Film caliper was 9± 1 mils (0.230± 0.025 mm). After heating for 3 minutes, the oven door was opened and the film strip was stretched uniaxially by hand in the oven until it was uniformly opaque white. Final stretch ratio was 4 to 1. A sample of unstretched film had a measured density of 1.59 g/cc. The density of the stretched film was 0.87 g/cc. The percent voids in the stretched film then was 45 percent by volume. The moisture vapor transmission (MVT) rate was 4,900 g/hr/100 sq. meters measured at a relative humidity difference of 100 to 50 percent and a temperature of 73° F. (23° C.). The stretched film was immediately permeated through by drops of 1,1,2-trichloro-1,2,2-trifluoroethane ("Freon" 113), chloroform, toluene, methyl ethyl ketone, a commerical oil based red rubber stamp pad ink, and opaque black pigmented Flowmaster pen ink. Film bending modulus was greatly reduced by the stretching.

Figure 4:
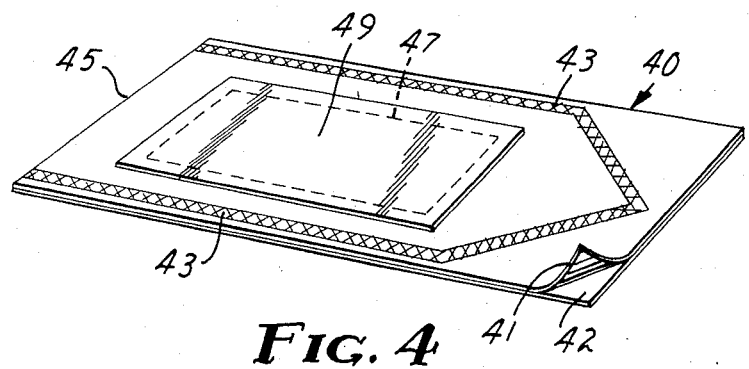
FIG. 4 is a perspective view of a heat-sealable, sterilizable bag utilizing a microporous film of this invention.

The microporous film produced by this Example was found to be particularly suitable for use in the first aid dressing of FIG. 1 and the sterilizable bag of FIG. 4.

EXAMPLE 2

Part A: Stretch-oriented Polyurethane Films

The polyurethane used in this Example was "Estane" 5707-F-1 polyesterurethane (trademark of B. F. Goodrich Chemical Company) derived from 1.00 mole poly (1,4-butylene adipate) glycol, 1.85 moles 1,4-butane diol, and 2.85 moles diphenylmethane-p,p'-diisocyanate. Solid "Estane" polyurethane pellets were milled with enough calcium carbonate to provide a mixture comprising 61 wt. percent calcium carbonate. The polyurethane/$CaCO_3$ mixture was then extruded to form a film of 11 ± 1 mils (0.280 ± 0.025 mm) caliper. Eight samples (Sample A – Sample H) were obtained in this manner. The extruded (but otherwise unstretched or unoriented) 11 mil film had an MVT rate of 49.5 microgram/$cm^2$hr. A Gurley Densometer reading was then taken (see, for example, ASTM test D726); which involves forcing a given quantity of air through a given cross-sectional area of a film and measuring the time (in seconds) required to force the air through. The Gurley reading varies with the caliper of the film. For the non-stretch oriented 11 mil film, no Gurley reading could be obtained, indicating that the film was substantially impermeable to air under the test conditions. A 2:1 uniaxial stretch orientation (Sample A) reduced the caliper to 10 ± 1 mils (0.250 ± 0.025 mm) and increased the MVT rate to 3,260 microgram/$cm^2$hr, but the Gurley reading still indicated a substantially air-impermeable film. Significantly increased porosity measurements were observed with 3:1 uniaxial stretching and biaxial (up to 3 × 4) stretching, although the Gurley and MVT data did not correlate perfectly. The results are tabulated in Table I. All MVT rate measurements were taken at 72° F. (22° C.) and a 100/57 percent relative humidity (RH) differential. Film calipers in Table I were measured after orientation in mils. Caliper measurements are accurate to ± 1 mil (± 0.025 mm) and MVT rate measurements are subject to an experimental error which can be as high as 5 percent. Gurley porosity readings were taken using 50 cc of air and a one square inch (6.45 $cm^2$) area of film.

TABLE I

Polyurethane/$CaCO_3$ Film Samples
Stretch-Orientation vs. Porosity

| Sample | Orientation | Film caliper in mils (mm) | MVT ($\mu$g/$cm^2$hr) | Gurley Porosity (sec/50 cc-$in^2$) |
|---|---|---|---|---|
| Un-stretched | 1 × 1 | 11 (0.28) | 49.5 | not permeated |
| A | 2 × 1 | 10 (0.25) | 3260 | not permeated |
| B | 3 × 1 | 6 (0.15) | 5172 | 75 |
| C | 3 × 1.5 | 6 (0.15) | 6380 | 90.3 |
| D | 3 × 2 | 6 (0.15) | 6670 | 78.7 |
| E | 2.5 × 2.5 | 6 (0.15) | 7090 | 50.1 |
| F | 3 × 3 | 6 (0.15) | 7500 | 29.9 |
| G | 2.5 × 4 | 6 (0.15) | 7640 | 36.5 |
| H | 3 × 4 | 6 (0.15) | 5172 | 22.9 |

Part B: Effect of Leaching

For comparison, the "unstretched" (1 × 1 orientation) 11 mil polyurethane/CaCO₃ film of Example 2(A) was leached to approximately 40 percent of its original weight with hydrochloric acid, and the MVT of the leached film was measured under previously described conditions. The MVT rate was found to be only 425 microgram/cm²hr, a relatively insignificant value as compared to the MVT's of any of Samples A – H.

A second set of samples were prepared by dissolving 100 parts by weight of the "Estane" 5707–F1 (polyesterurethane—see Example 2(A) and dispensing 180 parts of sodium chloride in the solution. Films were cast from the solution and the solvent was removed. The sodium chloride was leached from the cast and dried films without any stretch orientation prior to leaching. MVT rates for three different calipers of leached, unoriented film are set forth in Table II.

TABLE II

Polyurethane/NaCl Films (Leached, Unoriented)

| Caliper in mils (mm) | MVT ($\mu g/cm^2 hr$) |
| --- | --- |
| 15 (0.38) | 8435 |
| 10 (0.25) | 9000 |
| 6 (0.15) | 9020 |

These MVT data reflect the lower density, hence higher volume of sodium chloride filler prior to leachings and higher void volumes after leaching. Otherwise the data show little, if any, improvement over Samples A – H.

EXAMPLE 3

In this Example, porous polypropylene films were made from "Profax 6723" (trademark of Hercules, Inc.) and calcium carbonate, as in Example 1, except that film samples were extruded. Both uniaxial orientation (2:1, 3:1, and 4:1 in the machine direction) and biaxial orientation (2 × 2 and 3 × 3, machine direction × cross direction) were used to obtain porosity, and the effect of varying the amount of calcium carbonate filler from 50 – 200 parts by weight per 100 parts by weight of polypropylene (phr) was also investigated by making samples from four lots of material:

| Lot | CaCO₃ wt.% | phr | Polypropylene (wt.%) |
| --- | --- | --- | --- |
| 1 | 33.3 | 50 | 66.6 |
| 2 | 50 | 100 | 50 |
| 3 | 60 | 150 | 40 |
| 4 | 66.6 | 200 | 33.3 |

Film calipers were generally 6 or 7 ± 1 mil.

The Gurley Densometer readings are tabulated in Table III.

TABLE III

Porosity of Non-leached, Stretch Oriented, CaCO₃-Loaded Films: Orientation and Amount of Filler vs. Gurley Porosity

| Amt. of Filler (phr) | Orientation (machine dir. × cross dir.) | Gurley Densometer Readings in seconds/volume/sq.inch (6.45cm²) | | |
| --- | --- | --- | --- | --- |
| | | sec/10cc | sec/50cc | sec/100cc |
| 50 | 2 × 1 | 1000 | 1000 | 1000 |
| 100 | 2 × 1 | 1000 | 1000 | 1000 |
| 150 | 2 × 1 | 100 | 397 | 878 |
| 200 | 2 × 1 | 37 | 136 | 282 |
| 50 | 3 × 1 | 1000 | 1000 | 1000 |
| 100 | 3 × 1 | 497 | 1000 | 1000 |
| 150 | 3 × 1 | 29 | 172 | 343 |
| 200 | 3 × 1 | 14 | 63 | 150 |
| 50 | 4 × 1 | 1000 | 1000 | 1000 |
| 100 | 4 × 1 | 239 | 1000 | 1000 |
| 150 | 4 × 1 | 25 | 104 | 205 |
| 200 | 4 × 1 | 9 | 46 | 99 |
| 50 | 2 × 2 | 1000 | 1000 | 1000 |
| 100 | 2 × 2 | 156 | 721 | 1000 |
| 150 | 2 × 2 | 11 | 65 | 165 |
| 200 | 2 × 2 | 6 | 30 | 66 |
| 50 | 3 × 3 | (broke during orientation) | | |
| 100 | 3 × 3 | 32 | 121 | 252 |
| 150 | 3 × 3 | 1 | 6 | 16 |
| 200 | 3 × 3 | 1 | 5 | 11 |

EXAMPLE 4

The effect of leaching porous polypropylene films made from Lot 4 (200 phr calcium carbonate) by making additional comparative samples was investigated. The comparative samples contained a leachable filler, in this case 225 parts by weight of sodium chloride for each 100 parts by weight of "Profax" 6723 polypropylene. The sodium chloride-containing comparative samples were leached free of the filler with water and then measured for MVT rate, but the Lot 4 samples were measured for MVT rate without any leaching step. All samples were stretch oriented at 4 × 1 or 3 × 2. The comparison is set forth in Table IV.

TABLE IV

Effect of Leaching On Stretch-Oriented Films

| Filler (phr) | Leached | Orientation (mach. dir. × cross dir.) | MVT ($\mu g/cm^2 hr$) |
| --- | --- | --- | --- |
| 225 NaCl | Yes | 4 × 1 | 4675 |
| 225 NaCl | Yes | 3 × 2 | 4925 |
| 200 CaCO₃ | No | 4 × 1 | 4475 |
| 200 CaCO₃ | No | 3 × 2 | 4950 |

The differences in MVT rate between leached and unleached films were not significant in view of the experimental error of the MVT determination.

In the preceding Examples, the MVT rate was measured according to the method described in Elton, U.S. Pat. 3,640,829, issued Feb. 8, 1972. Sufficient control of ambient humidity was maintained to keep the experimental error in this test to within 5 percent, except for Example 1, where the error was believed larger, though within 10 percent.

What is claimed is:

1. A stretch-oriented, elastomeric, porous polyurethane film less than 80 mils in thickness having a void volume of about 5 – 60 volume percent, said void volume being in the form of an interconnecting network of voids, said voids averaging about 3 – 250 microns in their longest dimension, said polyurethane film having been stretch-oriented at a stretch ratio of at least 1.5:1 in at least one direction, thereby being enlarged in area to at least 1.5 times as large as the original area and thereby being decreased in thickness, said polyurethane film containing 5 to 60 percent by volume of an inorganic water insoluble pore nucleating agent distributed throughout said interconnecting network of voids and being smaller in average size than the said average size of said voids, said polyurethane film having a moisture vapor transmission value of at least 500microgram/cm$^2$hr for a relative humidity difference on opposite sides of said polyurethane film of no less than 100/60 percent.

2. A polyurethane film according to claim 1 wherein said film is coated with a pressure-sensitive adhesive.

3. A film according to claim 2 wound upon itself to form a roll comprising a plurality of convolutions.

4. A film according to claim 1 laminated to a nonadherent, moisture-transmissive burn covering material.

5. A film according to claim 4 wound upon itself to form a roll comprising a plurality of convolutions.

6. A first aid dressing comprising a film according to claim 1 laminated to an absorbent pad.

* * * * *